US012603422B2

(12) United States Patent
Dvorak et al.

(10) Patent No.: US 12,603,422 B2
(45) Date of Patent: Apr. 14, 2026

(54) ANTENNA MOUNT SYSTEM

(71) Applicant: Wilson Electronics, LLC, St. George, UT (US)

(72) Inventors: Kyle Gabriel Dvorak, Dallas, TX (US); Aaron Jay Hamilton, Royse City, TX (US); Scot Herbst, Santa Cruz, CA (US)

(73) Assignee: Wilson Electronics, LLC, St. George, UT (US)

( * ) Notice: Subject to any disclaimer, the term of this patent is extended or adjusted under 35 U.S.C. 154(b) by 237 days.

(21) Appl. No.: 18/638,491

(22) Filed: Apr. 17, 2024

(65) Prior Publication Data

US 2024/0347900 A1 Oct. 17, 2024

Related U.S. Application Data

(60) Provisional application No. 63/496,659, filed on Apr. 17, 2023.

(51) Int. Cl.

| | |
|---|---|
| ***H01Q 1/32*** | (2006.01) |
| ***H01Q 1/08*** | (2006.01) |
| ***H01Q 1/12*** | (2006.01) |
| ***H01Q 3/04*** | (2006.01) |

(52) U.S. Cl.

CPC ........... *H01Q 1/3275* (2013.01); *H01Q 1/084* (2013.01); *H01Q 1/1207* (2013.01); *H01Q 1/1228* (2013.01); *H01Q 3/04* (2013.01)

(58) Field of Classification Search

CPC ........ H01Q 1/084; H01Q 1/207; H01Q 1/228; H01Q 1/3275; H01Q 3/04; B60R 2011/0066; B60R 2011/0082; B60R 2011/0084; B60R 2011/0085

See application file for complete search history.

(56) References Cited

U.S. PATENT DOCUMENTS 2,313,652 A * 3/1943 Lyman .................. H01Q 1/084 343/903
2,962,248 A * 11/1960 Ertel ...................... H01Q 1/125 248/539
4,109,251 A * 8/1978 MacDougall .......... H01Q 1/084 343/882
5,252,985 A * 10/1993 Christinsin ............ H01Q 1/084 343/882
5,445,102 A * 8/1995 Rupp ...................... B63B 35/14 43/27.4
5,743,635 A * 4/1998 Hulse .................... E04H 12/182 362/385

* cited by examiner

*Primary Examiner* — Amal Patel
(74) *Attorney, Agent, or Firm* — Thorpe North & Western, LLP.

(57) ABSTRACT

An antenna mount system mounts an antenna on a mast to a vehicle. The system has an articulated elbow with upper and lower mounts pivotally coupled together by an axle. A locking knob is carried by the articulated elbow and slidable along the axle towards and away from the articulated elbow. A locking pin is carried by the locking knob and slidable with the locking knob between locked and unlocked positions. A radial array of bores is formed in the articulated elbow and arrayed about the axle. Each bore is selectively engageable by the locking pin to lock the upper mount with respect to the lower mount. A mast bore is formed in the upper mount to be coupled to an end of the mast.

20 Claims, 9 Drawing Sheets

ANTENNA MOUNT SYSTEM

PRIORITY DATA

This application claims the benefit of U.S. Provisional Patent Application Ser. No. 63/496,659, filed Apr. 17, 2023, which is incorporated herein by reference.

BACKGROUND

Overlanding has become increasingly popular and quite often involves on-road and off-road vehicles traveling to locations that can depend on self-reliance. Cell phone connectivity while overlanding can be an important aspect of both communication and safety. In addition, cell phone connectivity while overlanding can often require a cell phone booster which can include an external antenna coupled to the booster. The external antenna may need to be mounted in the highest location possible and often may be mounted on an existing structure (roof rack, vertical ladder, roll cage tubing) of an overlanding vehicle, also referred to as a utility task vehicle (UTV) or off-road vehicle (ORV). The elevation or height of the external antenna on the overlanding vehicle may exceed highway regulations and/or may impact roadway structures, such as bridges or signs, as the vehicle travels.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
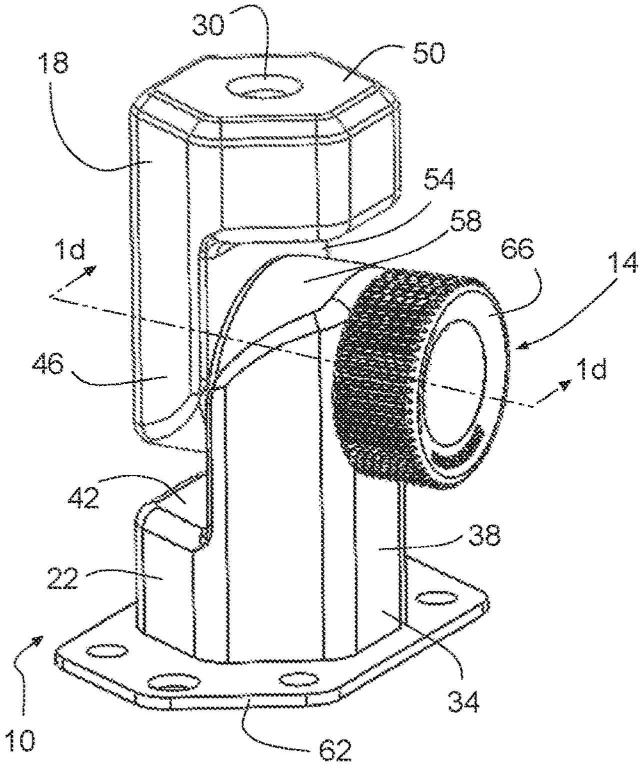
FIG. 1*a* is a perspective view of a mount of a mount system in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An antenna mount system can mount an antenna on a mast to a vehicle. The vehicle can be an overlanding vehicle, such as off-road and/or recreational vehicle, that can travel away from cell towers. Thus, the antenna can be mounted on the mast, and the mast can be mounted on the vehicle, to raise the antenna to a greater elevation. The elevation or height of the antenna and/or the mast on the vehicle may exceed highway regulations and/or may impact roadway structures, such as bridges or signs, as the vehicle travels. Thus, the mast with the antenna can be selectively mounted and/or raised and retracted by the antenna mount system.

The technology provides a ruggedized mount and system that can provide multiple mounting options to different vehicle structures, and can be adjusted to multiple angles as needed to accommodate the different vehicle structures, and to raise and lower the antenna for use and travel, respectively. The mount can utilize a standard ⅜"-24 threaded hole for an external antenna mast or antenna accessory (such as a spring and/or side-exit cable adapter). The mount and system can include hardware to mount with a T-slot roof rack or on tubing up to 1.5" in diameter. Additionally, a multi-hole base plate can be used to mount directly to a flat structure using screws/bolts. The mount can have 180 degrees of angle adjustability and can be adjusted in selected increments. In one example, the increments can be 45 degree increments from 0, 45, 90, 135 and 180 degrees so that it can be mounted horizontally or vertically or folded down to reduce height in transit, and without disconnecting an antenna cable. The mount can be configured for other angled increments based on a desired system design. The mount angle can be adjusted by pulling a knob out, then turning the mast to the desired angle and releasing the knob.

The system can comprise an articulated elbow that can be carried by the vehicle. The elbow can have upper and lower mounts pivotally coupled together by an axle. The upper and lower mounts can be selectively fixed together at select angular orientations. A locking knob can be carried by the elbow and slidable along the axle towards and away from the elbow. A locking pin can be carried by the locking knob and slidable with the locking knob between locked and unlocked positions. A radial array of bores can be formed in the elbow and arrayed about the axle. The bores can be selectively engaged by the locking pin to lock the upper mount with respect to the lower mount at a select angular orientation.

A mast bore can be formed in the upper mount to be coupled to an end of the mast. In one aspect, the mast bore can be threaded to receive a threaded end of the mast, a side-exit adapter carried by the end of the mast, or a spring carried by the end of the mast. In another aspect, the mast bore can be a blind hole without the coaxial cable passing through into the elbow, or without passing between the upper and lower mounts.

Figure 1B:
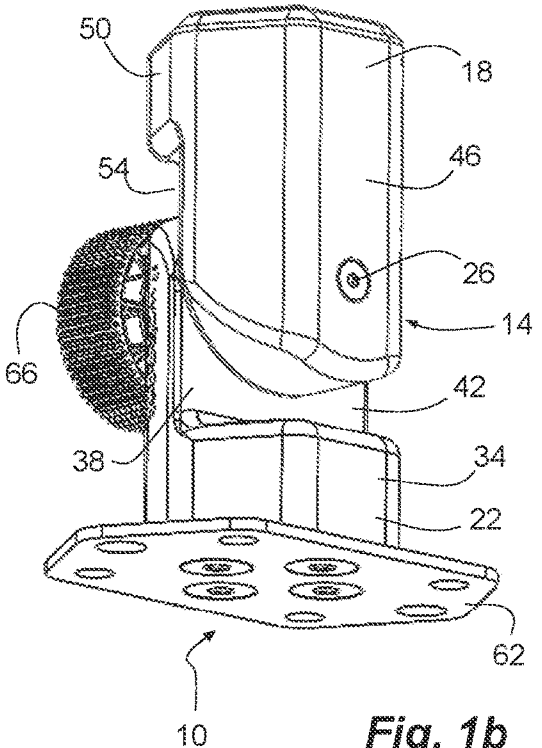
FIG. 1*b* is another perspective view of the mount of FIG. 1*a;*
Figure 1C:
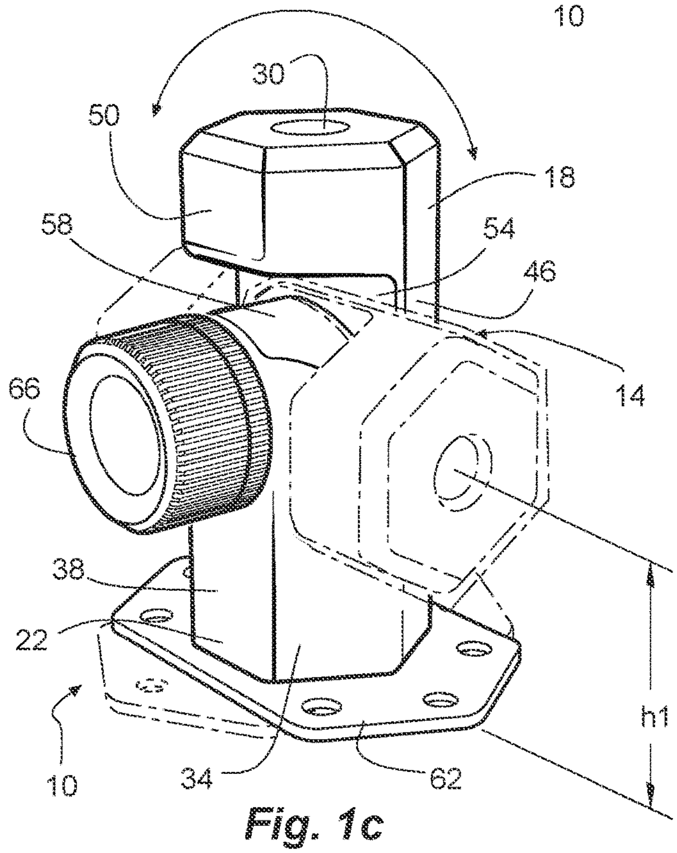
FIG. 1*c* is another perspective view of the mount of FIG. 1*a* showing various angular orientations.
Figure 1D:
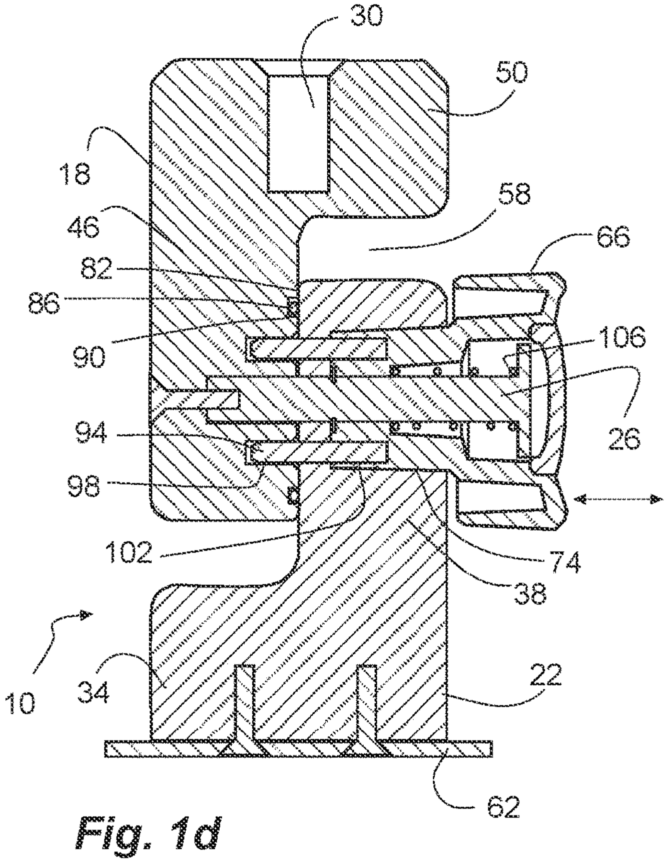
FIG. 1*d* is cross-sectional side view of the mount of FIG. 1*a*, taken along line 1*d*, and showing a locking knob in a locked position.
Figure 1E:
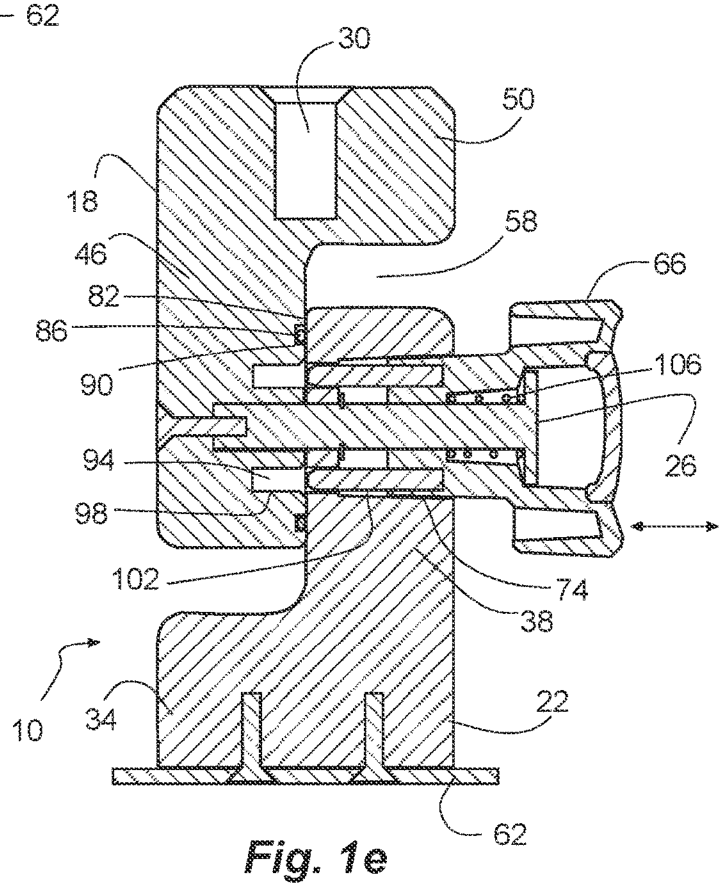
FIG. 1*e* is cross-sectional side view of the mount of FIG. 1*a*, taken along line 1*d*, and showing the locking knob in an unlocked position.
Figure 2A:
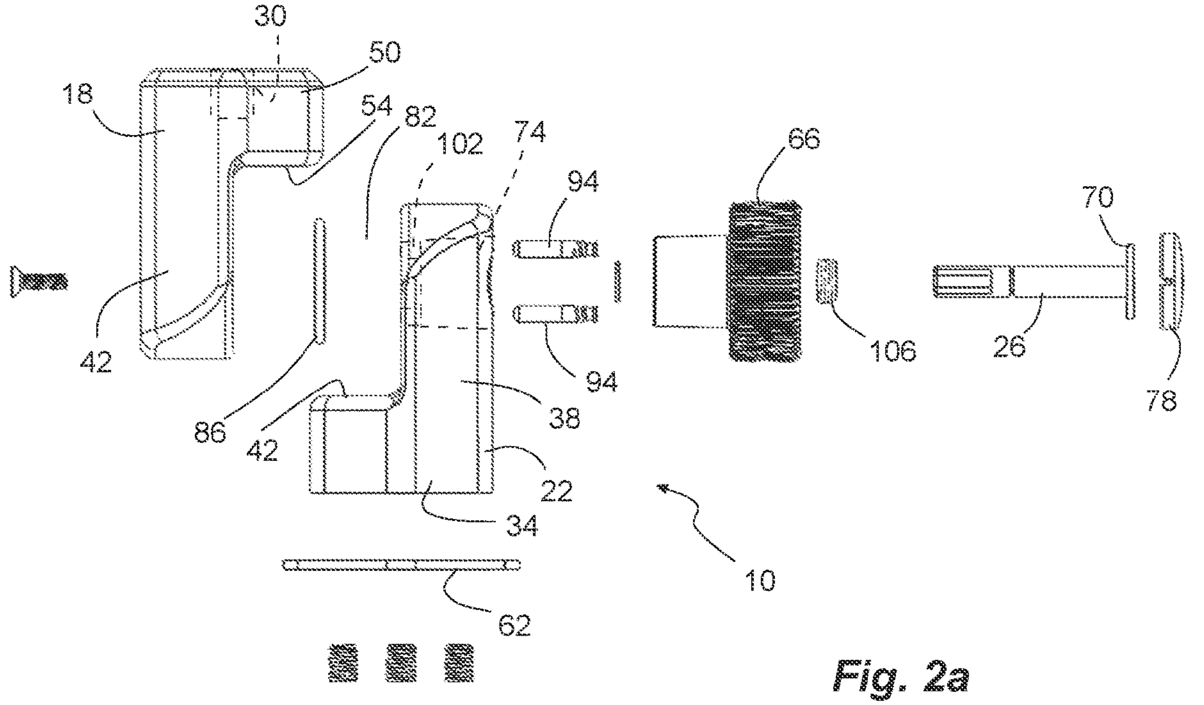
FIG. 2*a* is an exploded side view of the mount of FIG. 1*a;*
Figure 2B:
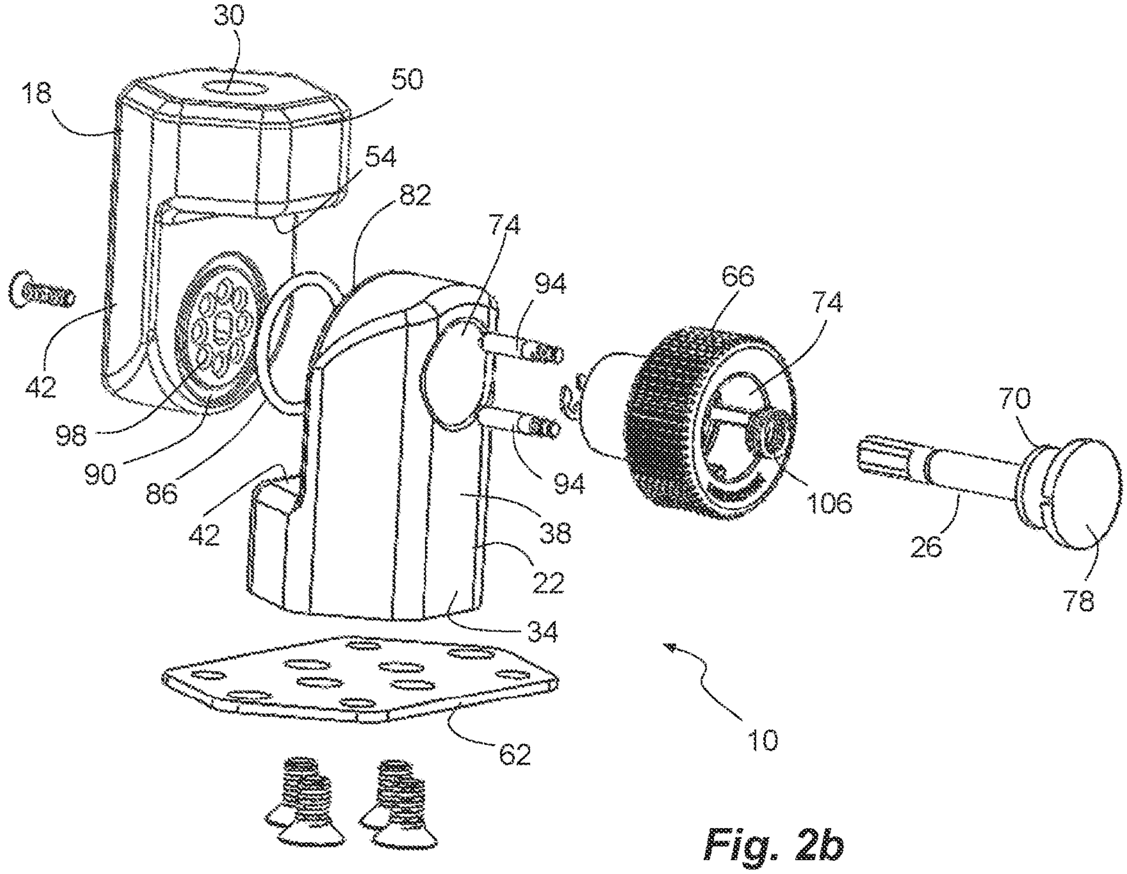
FIG. 2*b* is an exploded perspective view of the mount of FIG. 1*a;*

FIGS. 1*a*-1*c* depict an example of a mount 10 in an example of the invention. The mount 10 can be part of a mount system described in greater detail herein. The mount 10 can include an articulated elbow 14 with an upper mount 18 pivotally coupled to a lower mount 22 by an axle 26. The upper mount 22 can have a mast bore 30 to be coupled to an end of a mast described in greater detail herein. In one aspect, the upper and lower mounts 18 and 22 can be solid bodies for strength. In another aspect, the upper and lower mounts 18 and 22 can be formed of hard anodized aluminum and can be formed by casting and then can be anodized.

In one aspect, the lower mount 22 can comprise a plinth 34 that can be selectively coupled to and carried by the vehicle, as discussed herein. A lower pillar 38 can be carried by and can extend from the plinth 34. The lower pillar 38 can be offset with respect to the plinth 34. A lower recess 42 can be formed between the lower pillar 38 and the plinth 34, and can be positioned above the plinth 34 and proximate the lower pillar 38. Both the plinth 34 and the lower pillar 38 can be solid and can form a solid lower mount 22.

In another aspect, the upper mount 18 can comprise an upper pillar 46 pivotally coupled to the lower pillar 38 by the axle 26. A cap 50 can be carried by the upper pillar 46 and can have the mast bore 30. The upper pillar 46 can be offset with respect to the cap 50. An upper recess 54 can be formed between the upper pillar 46 and the cap 50, and can be positioned below the cap 50 and proximate the upper pillar 46. Both the cap 50 and the upper pillar 46 can be solid and can form a solid upper mount 18.

As described above, the upper and lower pillars 46 and 38 can be offset with respect to the cap 50 and the plinth 34. The lower pillar 38 can be received in the upper recess 54, and the upper pillar 46 can be received in the lower recess 42. The upper and lower mounts 18 and 22 can be aligned in an aligned orientation with the cap 50 positioned over the plinth 34. In the aligned orientation, the cap 50 and the plinth 34 can have a matching profile in a plan view (looking down on the articulated elbow 14 and into the mast bore 30). Thus, the mount 10 and the articulated elbow 14 can have a condensed profile to facilitate mounting. In another aspect, a bottom of the upper pillar 42 and a top of the lower pillar 38 can be arcuate to facilitate pivoting of the upper and lower pillars 18 and 22.

In addition, the upper and lower pillars 46 and 38 can fill a majority of a gap 58 between the cap 50 and the plinth 34 in the aligned orientation. The gap 58 can be formed between a top of the lower pillar 38 of the lower mount 22 and the cap 50 of the upper mount 18. As described above, the upper and lower mounts 18 and 22 can be solid. The gap 58 can be free of a coaxial cable when the mast is coupled to the upper mount 18 as described herein. Thus, the mount 10 and the articulated elbow 14 can resist entry and bending of a coaxial cable of the antenna.

The mast bore 30 can be formed in the articulated elbow 14 and can be coupled to an end of a mast with the antenna. The mast bore 30 can be formed in the cap 50 of the upper mount 18. In one aspect, the mast bore 30 can be a blind hole without passing therethrough to the gap 58 between the upper and lower mounts 18 and 22. Thus, the coaxial cable is not passed into the articulated elbow 14 to resist bending and/or pinching the coaxial cable. In another aspect, the mast bore 30 can be threaded (e.g. standard ⅜"-24) to receive a threaded end of the mast or an antenna accessory such as a spring or side-exit cable adapter as described herein.

The mount 10 and the articulated elbow 14 can have a raised deployed orientation (shown in solid lines in FIG. 1*c*) and a lowered retracted orientation (shown in dashed lines in FIG. 1*c*). In the raised orientation, the upper mount 18 can be oriented vertically corresponding to a vertical deployed orientation of the mast bore 30, the mast and the antenna. In the lowered orientation, the upper mount 18 can be oriented horizontally, corresponding to a horizontal retracted orientation of the mast bore 30, the mast and the antenna.

The mount 10 and the articulated elbow 14 can be carried by a base plate 62. Namely, the lower mount 22 can be secured to and carried by the base plate 62. The base plate 62 can be mountable to the vehicle as discussed herein. The base plate 62 can be flat and thin with respect to the articulated elbow 14. In addition, the base plate 62 can have a larger footprint or profile in the plan view than the articulated elbow 14 in the aligned orientation. Thus, the base plate 62 can provide stability and can transfer torque loads. In addition, the base plate 62 can provide a flange with apertures to receive fasteners. In one aspect, the base plate 62 can be selectively fastened to the lower mount 22 by fasteners. In another aspect, the base plate 62 can have an oblong shape with a longer dimension and a shorter dimension transverse to the longer dimension. The base plate 62 can be selectively oriented with respect to the articulated elbow 14 about an axis perpendicular to the axle 26 so that the base plate 62 can be selectively oriented with respect to the articulated elbow 14 to facilitate mounting. In one aspect, the base plate 62 can be oriented with the longer dimension aligned with a plane in which the upper mount 18 pivots and transvers to a pivot axis of the axle (shown in solid lines in FIG. 1*c*). In another aspect, the base plate 62 can be oriented with the longer dimension aligned with the pivot axis of the axle and transverse to the plane in which the upper mount 18 pivots (shown in dashed lines in FIG. 1*c*).

The base plate 62 can be selectively fixed with respect to the articulated elbow 14 and the lower mount 22, such as with threaded fasteners. In one aspect, the base plate 62 can be formed of powder coated steel and can be formed by stamping from sheet metal and then powder coated.

A locking knob 66 can be carried by the articulated elbow 14, such as by the axle 26 and/or the lower mount 22. The locking knob 66 can be slidable along the axle 26 towards and away from the articulated elbow 14. The locking knob 66 can slide between at least two positions, comprising locked and unlocked positions. In the locked position, the locking knob 66 can be slid towards the articulated elbow 14. In the unlock position, the locking knob 66 can be slid away from the articulated elbow 14. In one aspect, the locking knob 66 can be formed of ultra-violet (UV) stabilized nylon and can be formed by injection molding.

FIGS. 1*d*-2*b* further depict the example of the mount 10. The axle 26 can be a rod with an enlarged head 70. In one aspect, the locking knob 66 can have a cavity 74 to slidably receive the enlarged head 70 of the axle 26. A cap 78 can close an opening in the locking knob 66 to the cavity 74. The axle 26 can pass through the upper and lower pillars 46 and 38. An interface 82 can be formed between the upper and lower mounts 18 and 22 of the articulable elbow 14. The upper and lower pillars 46 and 38 can have substantially flat surfaces that abut to one another. An annular elastic member 86, such as an O-ring, can be pressed in the interface 82 between the upper and lower mounts 18 and 22. At least one of the upper or lower mounts 18 or 22 can have an annular groove 90 to receive the annular elastic member 86. A fastener can extend through the upper pillar 46 of the upper mount 18 and into an end of the axle 26 opposite the enlarged head 70. A retaining ring, such as a C-ring or an E-ring, can reside in a groove in the rod of the axle 26 opposite the fastener and against the lower pillar 38 of the lower mount 22 to retain the upper and lower mounts 18 and 22 together on the axle 26.

In one aspect, at last one locking pin 94 can be carried by the locking knob 66 and the lower mount 22. The locking pin 94 can slide with the locking knob 66 between the locked and unlocked positions. The locking pin 94 can be radially spaced-apart from the axle 26. In another aspect, the locking knob 66 can have a pair of locking pins 94. The pair of locking pins 94 can be located radially spaced-apart from the axle 26. In addition, the pair of locking pins 94 can be located on opposite sides of the axle 26 from one another.

A radial array of bores 98 can be formed in the articulated elbow 14 and arrayed about the axle 26. In one aspect, the array of bores 98 can be formed in the upper mount 18 opposite the locking pin(s) 94 carried by the lower mount 22. In another aspect, the radial array of bores 98 can circumscribe the axle 26. In one aspect, each bore 98 of the radial array of bores 98 can be located at 45 degrees intervals about the axle 26 with respect to a proximate bore. Each bore 98 can be selectively engaged by the locking pin 94 to lock the upper mount 18 with respect to the lower mount 22. In one aspect, the pair of locking pins 94 can selectively engage opposite bores 98 of the radial array of bores 98 in the locked position. The upper mount 18 can be selectively pivotal about the axle 26 with respect to the lower mount 22 and the base plate 62 through a plurality of discrete angular orientations.

In one aspect, at least one through bore 102 can be formed in the articulated elbow 14. The through bore 102 can be in the lower pillar 38 of the lower mount 22. In another aspect, the articulated elbow 14 and the lower mount 22 can have a pair of through bores 102. The through bore(s) 102 can slidably receive the locking pin(s) 94. The locking pin(s) 94 can span the through bore(s) 102 and the bores 98 of the radial array of bores 98 in the locked position to lock the upper and lower mounts 18 and 22 together and resist relative rotation.

In one aspect, each bore 98 of the radial array of bores 98 can have an opening with a chamfer. The locking pin(s) 94 can have a distal free end with a chamfer. In one aspect, the pin(s) 94 can be formed of stainless steel and can be cut from bar stock. The locking pin(s) 94 can be adhered into bores in the locking knob 66. The locking pin(s) 94 can have a serpentine groove therein for adhesion relief.

In another aspect, the mount and the articulated elbow can be configured so that the locking knob can pivot the upper mount in the unlocked position. The upper mount, the locking knob and the axle can be affixed together, such as keyed, so that they can pivot together. In addition, the array of bores can be formed in the lower mount. Thus, the locking knob can be pulled into the unlocked position and pivoted to pivot the upper mount along with the mast and the antenna.

A spring 106 can be carried by the axle 26 and positioned between the locking knob 66 and the head 70 of the axle 26. The spring 106 can bias the locking knob 66 towards the articulated elbow 14 and into the locked position. When the locking knob 66 is pulled away from the articulated elbow 14 and into the unlocked position, the spring 106 is compressed between the locking knob 66 and the head 70 of the axle 26. When the locking knob 66 is released, the spring 106 pushed the locking knob 6 and the locking pin(s) 94 towards the articulated elbow 14 and into the locked position. The spring 106 can be positioned in the cavity 74 of the locking knob 66 and covered by the cap 78. In one aspect, the spring 106 can be a coil spring. The spring 106 can be formed of stainless steel.

The mount 10 can be designed for outdoor conditions. As described above, the upper and lower mounts 18 and 22 can be formed of hard anodized aluminum; the spring 106, the axle 26, the pins 94 and the fasteners can be formed of stainless steel; the base plate 62 can be formed of powder coated steel; and the locking knob 66 can be formed of UV stabilized nylon.

Figure 3A:
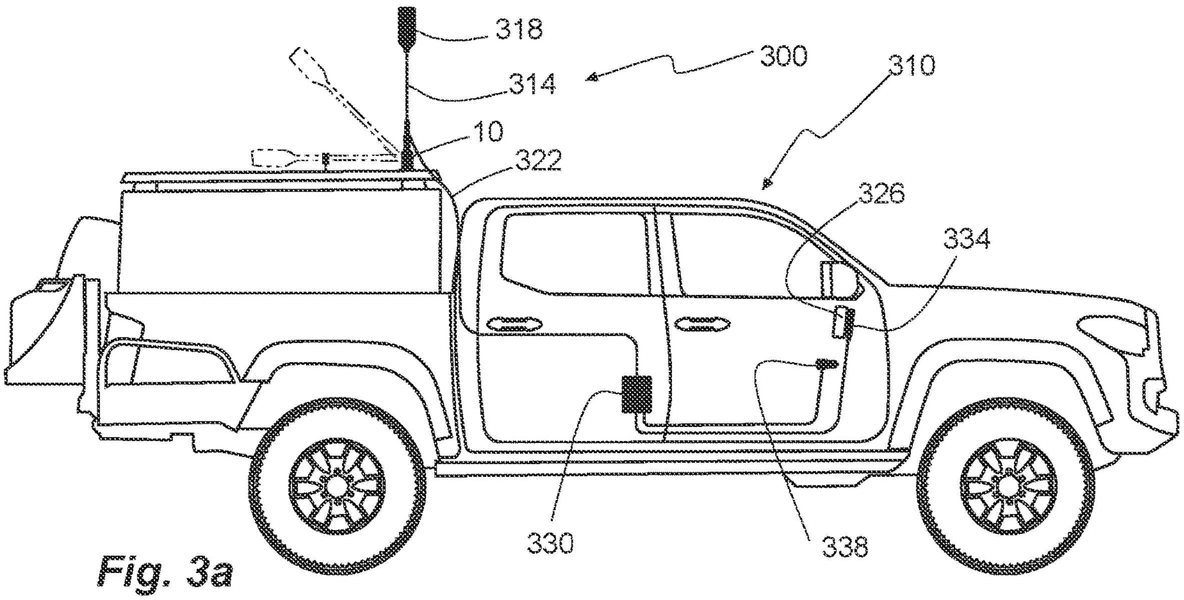
FIG. 3*a* is a schematic side view of a mount system in accordance with another example shown with the mount of FIG. 1*a* carried by an overlanding vehicle and with the mount carrying an antenna mounted on a mast.

FIG. 3*a* depicts an example of a mount system 300 in an example of the invention with the mount 10 mounted to a vehicle 310 and carrying a mast 314 with an antenna 318. Thus, the mount 10 and the articulated elbow 14 can be carried by the vehicle 310. The antenna 318 can be coupled to a coaxial cable 322 and the coaxial cable 322 can extend through a hollow in the mast 314. In one aspect, the coaxial cable 322 can be operatively coupled to a wireless device 326, such as a cellular phone or a satellite phone. In another aspect, the coaxial cable 322 can also be coupled to a signal booster 330 and a cradle 334 that carries the cellular phone and has an interior antenna. The antenna 318 can be configured to operate as a donor antenna for the signal booster 330. The interior antenna, which can be integrated in the cradle 334 or placed within the vehicle 310, can be configured to operate as a server antenna for the signal booster 330. The signal booster 330 can be coupled to a power source, such as a battery of the vehicle 310, using a cigarette lighter adapter (CLA) 338, a universal serial bus (USB) adapter, or another desired power adapter.

Figure 3B:
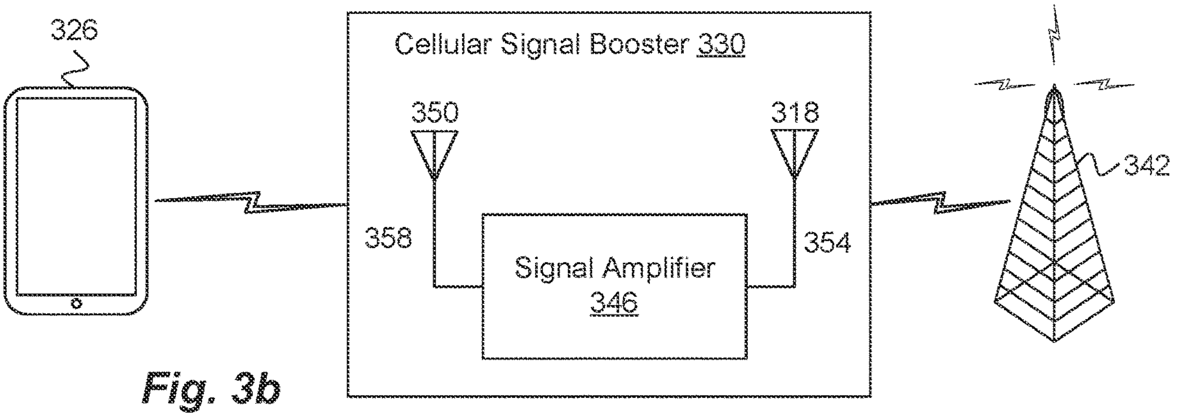
FIG. 3*b* is a schematic view of a signal booster of FIG. 3*a* in communication with a wireless device and a base station in accordance with an example.

FIG. 3*b* illustrates an exemplary signal booster 330 in communication with a wireless device 326 and a base station 342. The signal booster 330 can be referred to as a repeater. A repeater can be an electronic device used to amplify (or boost) signals. The signal booster 330 (also referred to as a cellular signal amplifier or bidirectional amplifier) can improve the quality of wireless communication by amplifying, filtering, and/or applying other processing techniques via a signal amplifier 346 to uplink signals communicated from the wireless device 326 to the base station 342 and/or downlink signals communicated from the base station 342 to the wireless device 326. In other words, the signal booster 330 can amplify or boost uplink signals and/or downlink signals bi-directionally. In one example, the signal booster 330 can be attached to a mobile object, such as the vehicle 310 or the wireless device 326.

In one configuration, the signal booster 330 can include a server antenna 350 (e.g., an inside antenna or a coupling antenna) and a donor antenna 318 (e.g., an outside antenna). The donor antenna 318 can receive the downlink signal from the base station 342. The downlink signal can be provided to the signal amplifier 346 via a second coaxial cable 354 or other type of radio frequency connection operable to communicate radio frequency signals. The signal amplifier 346 can include one or more cellular signal amplifiers for amplification and filtering. The downlink signal that has been amplified and filtered can be provided to the server antenna 350 via a first coaxial cable 358 or other type of radio frequency connection operable to communicate radio frequency signals. The server antenna 350 can wirelessly communicate the downlink signal that has been amplified and filtered to the wireless device 326.

Similarly, the server antenna 350 can receive an uplink signal from the wireless device 326. The uplink signal can be provided to the signal amplifier 346 via the first coaxial cable 358 or other type of radio frequency connection operable to communicate radio frequency signals. The signal amplifier 346 can include one or more cellular signal amplifiers for amplification and filtering. The uplink signal that has been amplified and filtered can be provided to the donor antenna 318 via the second coaxial cable 354 or other type of radio frequency connection operable to communicate radio frequency signals. The donor antenna 318 can communicate the uplink signal that has been amplified and filtered to the base station 342.

In one configuration, the signal booster 330 can be a Federal Communications Commission (FCC)-compatible consumer signal booster. As a non-limiting example, the signal booster 330 can be compatible with FCC Part 20 or 47 Code of Federal Regulations (C.F.R.) Part 20.21 (Mar. 21, 2013). In addition, the signal booster 330 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 330 can be configured to automatically self-monitor its operation to ensure compliance with applicable noise and gain limits. The signal booster 330 can either self-correct or shut down automatically if the signal booster's operations violate the regulations defined in FCC Part 20.21.

In one configuration, the signal booster 330 can improve the wireless connection between the wireless device 326 and the base station 342 (e.g., cell tower) or another type of wireless wide area network (WWAN) access point (AP). The signal booster 330 can boost signals for cellular standards, such as the Third Generation Partnership Project (3GPP) Evolved Universal Mobile Telecommunications System (UMTS) Terrestrial Radio Access (E-UTRA) Release 8, 9, 10, 11, 12, 13, 14, 15, 16, 17, or 18, or 3GPP 5G Release 15, 16, 17 or 18. In one configuration, the repeater 330 can boost signals for 3GPP E-UTRA Release 18.0.0 (January 2023) or other desired releases. The signal booster 330 can boost signals from the 3GPP Technical Specification (TS) 36.101 (Release 18 Jan. 2023) bands, referred to as E-UTRA frequency bands. For example, the signal booster 330 can be a multi-band signal booster configured to boost signals from selected E-UTRA and 5G frequency bands, such as bands: 2, 4, 5, 12, 13, 17, 25, and 26. In addition, the signal booster 330 can be configured to boost selected frequency bands based on the country or region in which the signal booster is used, including any of bands 1-88 and 103 or other bands, as disclosed in 3GPP TS 36.104 V18.0.0 (January 2023). The signal booster can be configured to meet the 3GPP TS 36.106 V17.0.0 (April 2022) and 38.106 V17.3.0 (January 2023) specification requirements.

In another configuration, the repeater 330 can boost signals from the 3GPP Technical Specification (TS) 38.101 (Release 18.0.0 January 2023) bands or 5G frequency bands. In addition, the repeater 330 can boost selected frequency bands based on the country or region in which the repeater is used, including any of the 5G frequency bands n1-n105 in Frequency Range 1 (FR1), and n257-n263, and non-terrestrial bands n255 and n256 or other bands, as disclosed in 3GPP TS 38.101-1 V18.0.0 (January 2023) and TS 38.101-2 V18.0.0 (January 2023).

In one example, the signal booster 330 can send uplink signals to a node and/or receive downlink signals from the node. The node can comprise a wireless wide area network (WWAN) access point (AP), a base station (BS), an evolved Node B (eNB) or gNB, a baseband unit (BBU), a remote radio head (RRH), a remote radio equipment (RRE), a relay station (RS), a radio equipment (RE), a remote radio unit (RRU), a central processing module (CPM), or another type of WWAN access point.

The signal booster 330 in the example of FIG. 3*a*, when mounted in a mobile vehicle 310, can be referred to as a mobile signal booster. The mobile signal booster or wireless repeater can comprise an exterior donor antenna 318 and an interior server antenna 350. The interior server antenna 350 can be integrated within a cradle 334 that receives the wireless UE, such as the mobile device 326. Alternatively, the server antenna 350 can be located at a separate location from the cradle 334 and electrically coupled to the cradle 334. Such mobile wireless repeaters or mobile signal boosters 330 in vehicles can have a limited or relatively small gain, presently 23 dB as determined by the FCC. A signal booster can also be configured to be used to boost the signal of UEs in stationary locations, such as a stationary signal booster fixed in buildings or stationary vehicles, such as a recreational vehicle (RV), along with a stationary wireless repeater or signal booster to amplify wireless communication signals. A stationary wireless repeater or signal booster can also comprise an exterior donor antenna and an interior server antenna. Such stationary wireless repeaters or signal boosters can have an expanded or relatively greater gain, presently 65-72 dB as determined by the FCC.

Figure 4:
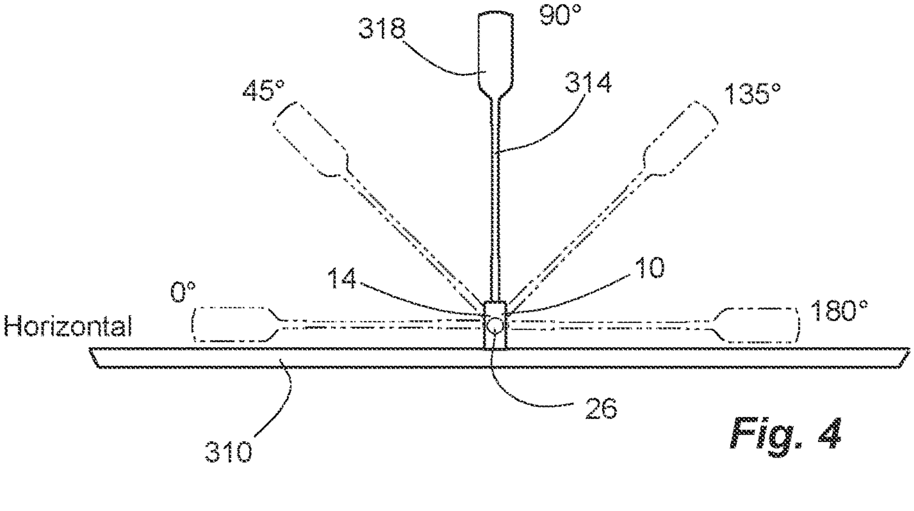
FIG. 4 is a schematic side view of the mount of FIG. 1*a* shown with the mount orienting the antenna on the mast at various angular orientations.

FIG. 4 further depicts an example of the mount 10 in an example of the invention. The mount 10 is shown mounted to a horizontal structure of the vehicle 310. The articulated elbow 14 of the mount 10 can selectively orient the mast 314 and the antenna 318 in one of a plurality of discrete orientations located at a selected angle increments, such as 15, 30, 45, 60, or 90 degrees about the axle 26 with respect to proximate locations. The mount 10 and the articulated elbow 14 can have 180 degrees of angle adjustability and can be adjusted in the selected angle increments, such as the 45-degree increments from 0, 45, 90, 135 and 180 degrees illustrated in the example of FIG. 4. Thus, the antenna 318 and the mast 314 can be mounted horizontally or vertically or folded down to reduce height in transit, and without disconnecting the antenna cable. In one aspect, the mount 10 and the articulated elbow 14 can orient the mast 314 and the antenna 318 upright in a vertical orientation to elevate the antenna 318. Such an orientation may improve a communication signal received by an antenna and send to the repeater for terrestrial communications, such as with a base station. In another aspect, the mount 10 and the articulated elbow 14 can orient the mast and/or an antenna 318 at an incline. Such an orientation may improve the communication signal by directing an antenna towards a specific terrestrial object such as a base station. In another embodiment, the mast 314 and/or antenna orientation can be changed to direct an antenna towards a moving object, such as a satellite, to enable the repeater to be used for non-terrestrial communications.

The mount system can comprise a plurality of different attachment fasteners to selectively couple to the base plate and to secure the base plate to different structures of the vehicle.

Figure 5A:
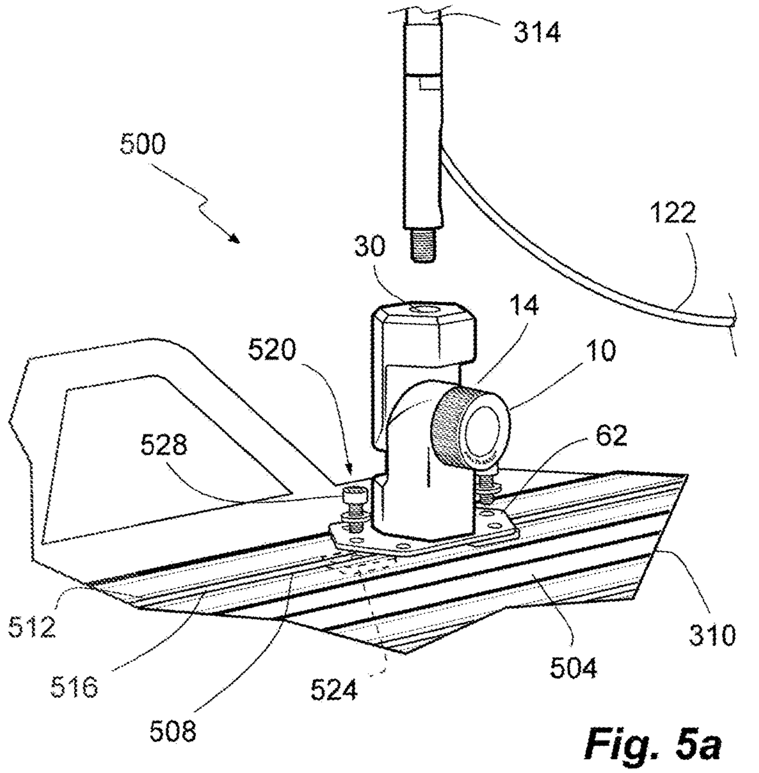
FIG. 5*a* is a schematic view of the mount system of FIG. 3*a* shown with the mast and a side-exit adapter in a raised deployed orientation and carried by a T-track of the vehicle.
Figure 5B:
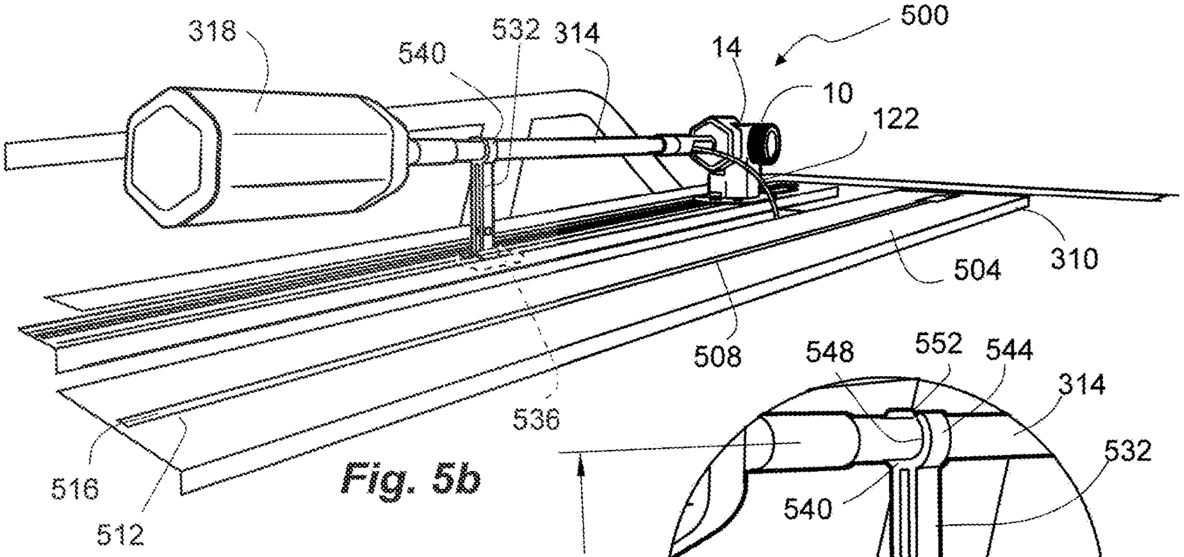
FIG. 5*b* is a schematic view of the mount system of FIG. 3*a* shown with the mast and the side-exit adapter in a lowered retracted orientation.
Figure 5C:
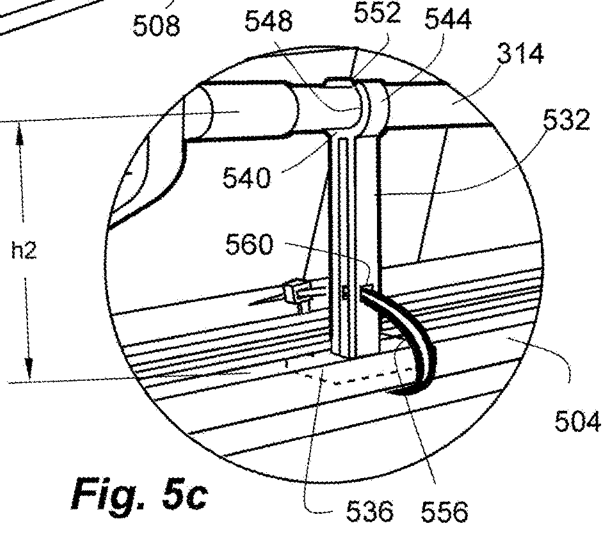
FIG. 5*c* is a detailed schematic view of a stabilizer arm of the mount system of FIG. 5*b;*

FIGS. 5*a*-5*c* depict an example of a mount system 500 in an example of the invention. The vehicle 310 can carry a T-track 504 with a channel 508 and inner lips 512 of an opening 516 to the channel 508. The mount 10, the articulated elbow 14 and the base plate 62 can be selectively coupled to at least one T-fastener 520 that can engage the T-track 504 of the vehicle 310. The T-fastener 520 can have an enlarged head 524 to fit inside the channel 508 of the T-track 504 and abut to the inner lips 512 of the opening 516 to the channel 508. The T-fastener 520 can also have a threaded shaft 528 extending from the enlarged head 524. The threaded shaft 528 can engage the base plate 62 to secure the base plate 62 to the T-track 504 and the vehicle 310. In one aspect, the threaded shaft 528 can be a bolt that extends through the base plate 62 and the opening 516 to the channel 508 to threadedly engage a threaded bore of the enlarged head 524. In another aspect, the threaded shaft 528 can extend from the enlarged head 524, from the channel 508, through the opening 516 and the base plate 62 to receive a nut. In another aspect, a pair of T-fasteners 520 can be coupled to opposite sides of the base plate 62 and spaced-apart in the channel 508.

As described above, the base plate 62 can have long and short dimensions with the long dimension longer than the short dimension. The base plate 62 can be aligned with a longitudinal axis and the opening 516 of the T-track 504. Aligning the base plate 62 with the T-track 504 can increase the stability of the attachment. The articulated elbow 14 can be selectively oriented with respect to and coupled to the base plate 62 to orient a plane in which the upper mount 18 pivots to accommodate the vehicle 310 and associated structure.

A stabilizer arm 532 can be used with the mount 10 to secure the antenna 318 to the vehicle 310 and the T-track 504. The stabilizer arm 532 can extend between the mast 314 and the T-track 504. The stabilizer arm 532 can be spaced-apart from the base plate 62, the mount 10, and the articulated elbow 14. The stabilizer arm 532 can have an enlarged head 536 at a proximal end of the stabilizer arm 532 to fit inside the channel 508 of the T-track 504 and abut to the inner lips 512 of the opening 516 to the T-track 504. The stabilizer arm 532 can have a yoke 540 at a distal end opposite the enlarged head 536. The yoke 540 can have a pair of arms 544 with a gap 548 sized and shaped to receive the mast 314 therebetween. The yoke 540 can also have an opening 552 into the gap 548 between distal free ends of the pair of arms 544 sized smaller than the gap 548 and smaller than a cross-sectional dimension of the mast 314. The arms 544 of the yoke 540 can be flexible and elastic to separate to increase a size of the opening 552 to receive the mast 314 therethrough and return to decrease the size of the opening 552 to retain the mast 314 in the gap 548.

The stabilizer arm 532 can induce a cantilevered spring force in the mast 314 by having a height greater than the mount 10 and the articulated elbow 14. The cantilevered force of the mast 314 against the stabilizer arm 532 can maintain the position of the stabilizer arm 532 in the T-track 504 and can reduce noise from motion the mount system 500.

As shown in FIG. 1*c*, the articulated elbow 14 can have a retracted height h1 between the base plate 62 (and bottom of the lower mount 22) and an axis of the mast bore 30 (and the mast 314) in the upper mount 18 in the lowered or horizontal orientation. Referring again to FIG. 5*c*, the stabilizer arm 532 can have an arm height h2, parallel to the retracted height h1 (FIG. 1*c*) of the articulated elbow 14, between the base plate 62 (and bottom of the lower mount 22) and an axis of the gap 548 (and the mast 314). The mast 314 can extend substantially horizontally between the mast bore 30 and the gap 548 in the retracted orientation. The arm height h2 of the stabilizer arm 532 can be greater than the retracted height h1 of the articulated elbow 14 to induce the cantilevered spring force in the mast 314 extending between the mast bore 30 of the articulated elbow 14 and the gap 548 of the stabilizer arm 532 to retain a position of the stabilizer arm 532 in the T-track 504.

In another aspect, a fastener can secure the enlarged head 536 of the stabilizer arm 532 in the channel 508 of the T-track 504 of the vehicle 310. For example, a zip-tie 556 can extend through an aperture 560 in the stabilizer arm 532, and can extend around the T-track 504, as shown in FIG. 5*c*.

Figure 6A:
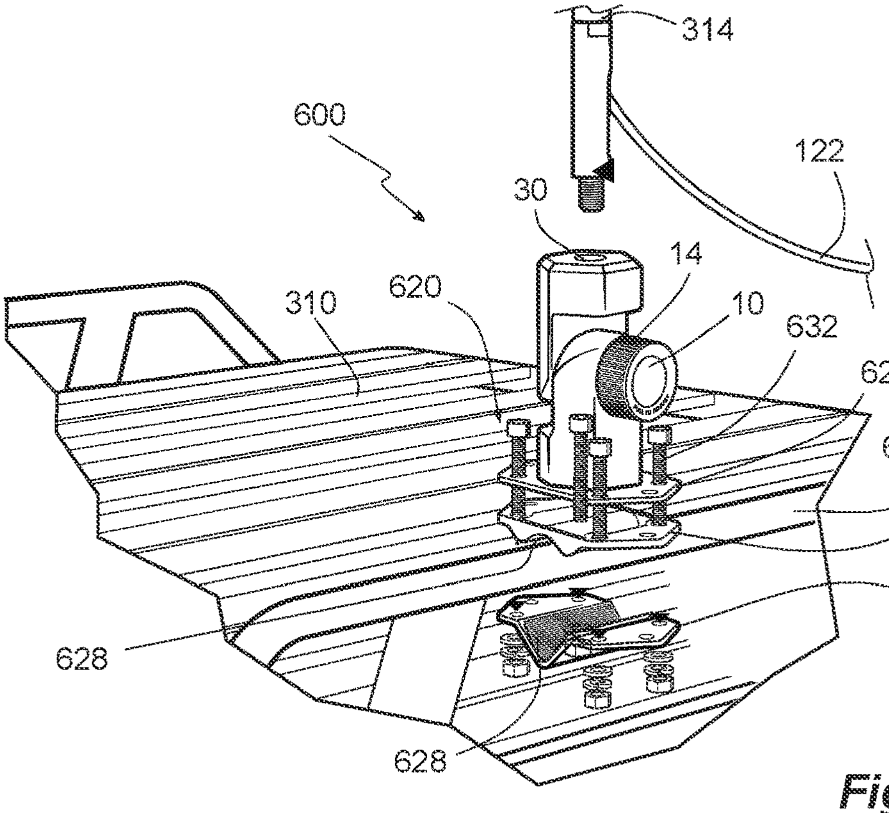
FIG. 6*a* is a schematic view of the mount system of FIG. 3*a* shown with the mast and the side-exit adapter in the raised deployed orientation and carried by a pole of the vehicle.
Figure 6B:
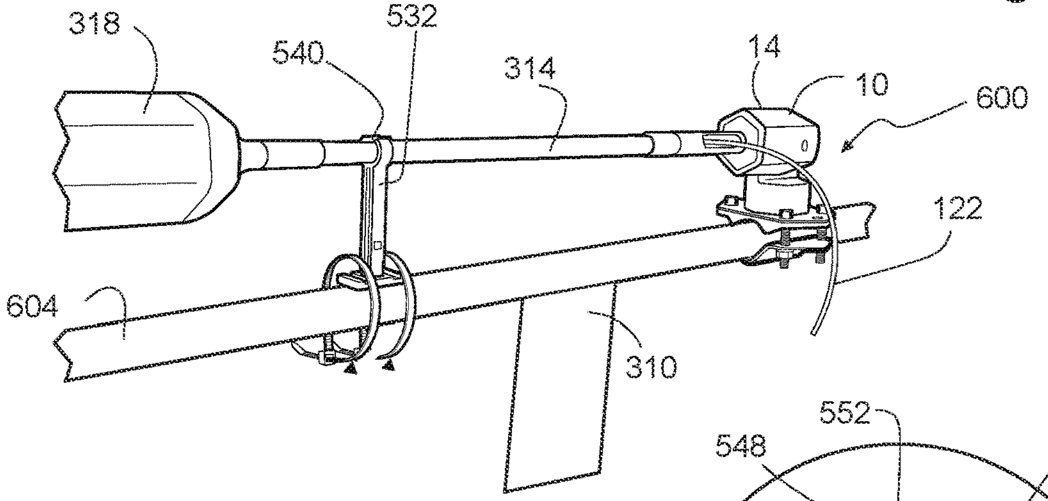
FIG. 6*b* is a schematic view of the mount system of FIG. 3*a* shown with the mast and the side-exit adapter in the lowered retracted orientation.
Figure 6C:
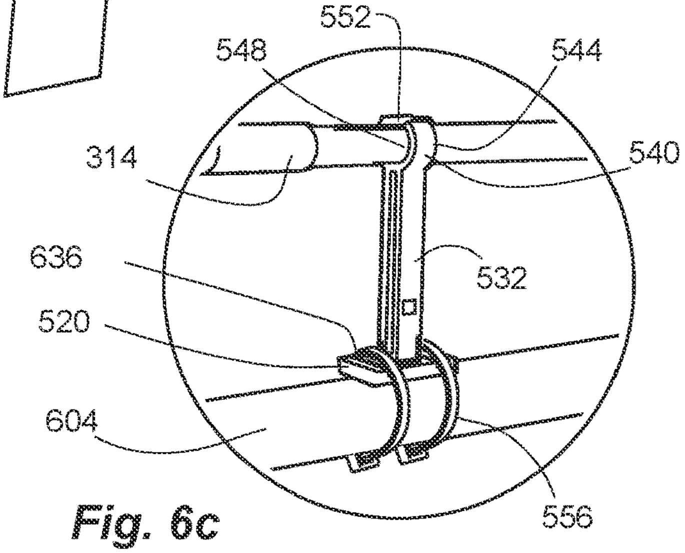
FIG. 6*c* is a detailed schematic view of a stabilizer arm of the mount system of FIG. 6*b;*

FIGS. 6*a*-6*c* depict an example of a mount system 600 in an example of the invention. The vehicle 310 can carry a pole 604. The pole 604 can be part of a rack carried by the vehicle 310. The mount 10, the articulated elbow 14 and the base plate 62 can be selectively coupled to the pole 604 by a pole clamp fastener 620 coupled to the base plate 62 and the articulated elbow 14 and engaging the pole 604. The pole clamp fastener 620 can comprise a pair of brackets 624 that can sandwich the pole 604 therebetween. The pair of brackets 624 can have indentations 628 to face one another with the pole 604 therebetween. Threaded fasteners 632 can extend between the pair of brackets 624 to clamp the pole 604 between the pair of brackets 624. The base plate 62 and the articulated elbow 14 can be coupled to one of the pair of brackets 624, such as by the threaded fasteners 632. One of the pair of brackets 624 can carry the base plate 62 and the articulated elbow 14. In one aspect, at least one flexible pad can be positioned between the pair of brackets 624 and the pole 604 to protect the pole and/or improve a grip between the brackets and the pole.

As described above, the stabilizer arm 532 can extend between the pole 604 and the mast 314. The stabilizer arm 532 can have the enlarged head 536 to engage the pole 604. In one aspect, the enlarged head 536 of the stabilizer arm 532 can have at least one groove 636. At least one zip-tie 556 can extend through the at least one groove 636 and can extend around the pole 604 to retain a position of the stabilizer arm 532 on the pole 604. In another aspect, the enlarged head 536 can have a pair of grooves 636 on opposite sides of the stabilizer arm 532 to receive a pair of zip-ties 556.

As described above, the stabilizer arm 532 can induce a cantilevered spring force in the mast 314 to force the stabilizer arm 532 against the pole 604 to maintain the position of the stabilizer arm 532 on the pole 604 and can reduce noise from motion the mount system 600.

Figure 7:
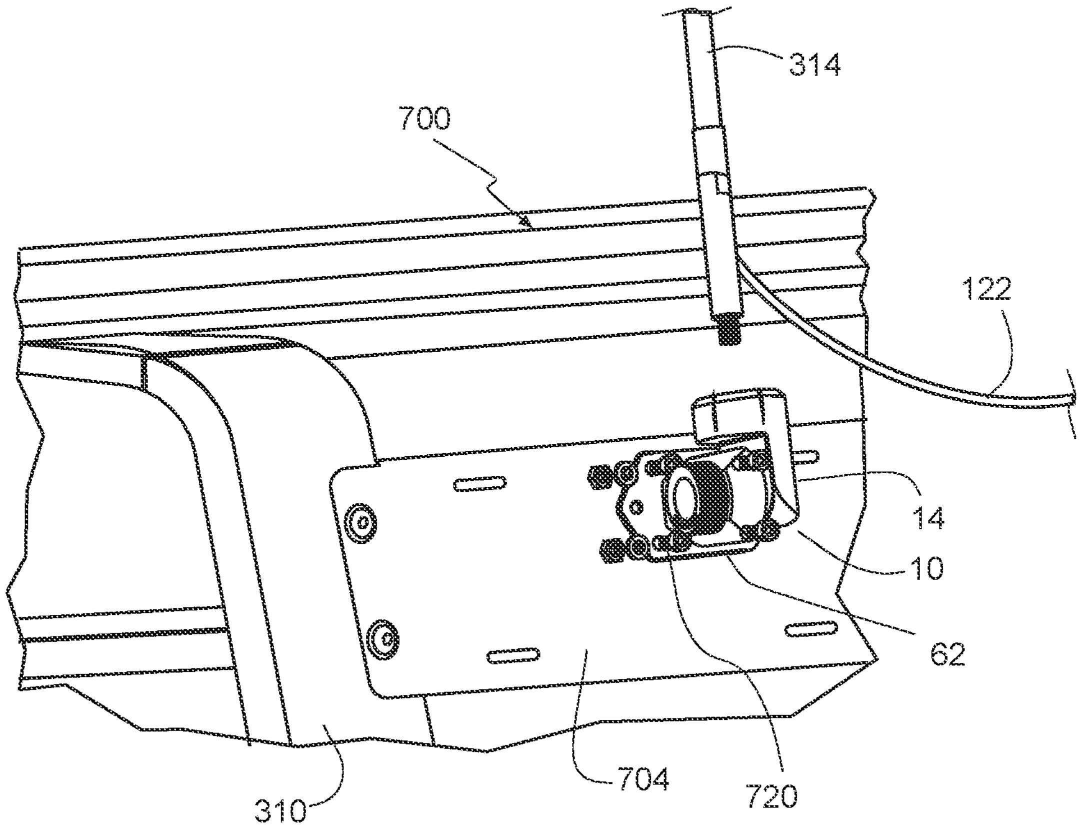
FIG. 7 is a schematic view of the mount system of FIG. 3*a* shown with the mast and the side-exit adapter in the raised deployed orientation and carried by a flat surface of the vehicle.

FIG. 7 depicts an example of a mount system 700 in an example of the invention. The vehicle 310 can carry a flat surface 704. The flat surface 704 can be part of a rack carried by the vehicle 310 or part of the vehicle itself. The mount 10, the articulated elbow 14 and the base plate 62 can be selectively engage and coupled to the flat surface 704. A threaded fastener 720 can extend between the base plate 62 and the flat surface 704 of the vehicle 310.

Figure 8A:
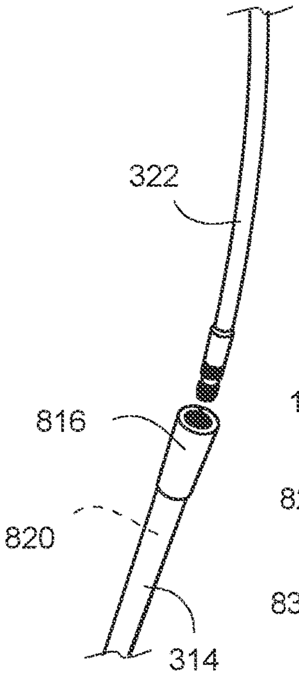
FIG. 8*a* is a partial detailed view of the mast and a coaxial cable of the mount system of FIG. 3*a;*
Figure 8B:
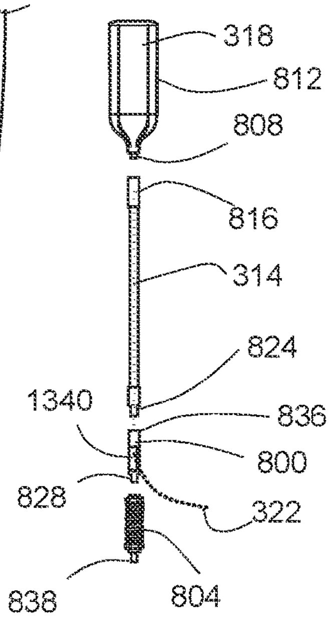
FIG. 8*b* is an exploded view of the antenna and mast of the mount system of FIG. 3*a;*
Figure 8C:
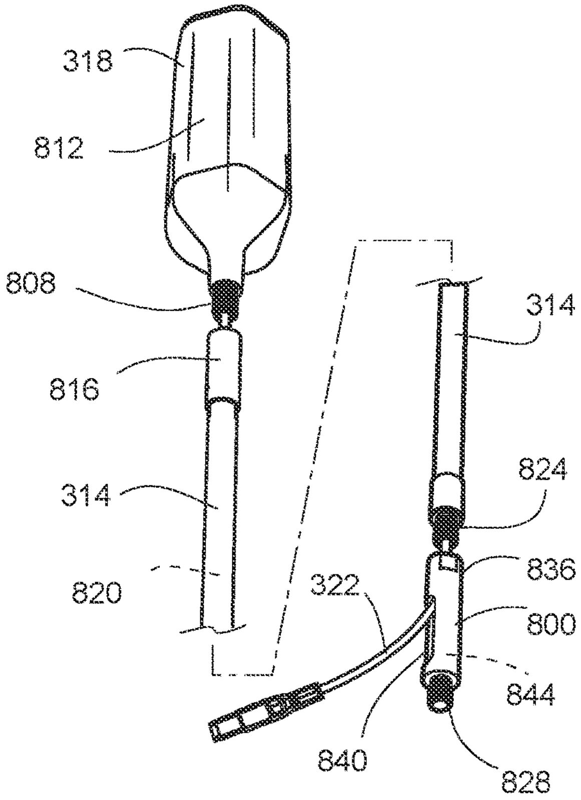
FIG. 8*c* is an exploded view of the antenna, the mast, and a side-exit adapter of the mount system of FIG. 3*a*.

FIGS. 8*a*-8*c* depict an example of the mast 314, the antenna 318, a side-exit adaptor 800, and a spring 804 that can be coupled to the mount and the articulated elbow. In one aspect, the antenna 318 can be carried by the mast 314. A threaded end 808 of the antenna housing 812 can be secured to a threaded bore 816 at a distal end of the mast 314. The mast 314 can have a hollow 820 therethrough to receive a coaxial cable 322 from the antenna 318. The spring 804 can provide stress relief to a connection between the mast 314 and the mount 10 (FIGS. 1-7). The side-exit adaptor 800 can divert the coaxial cable 322 out of the mast 314 and around the mount 10. As described herein, the mast bore 30 (FIGS. 1-7) can be threaded. The mast 314, the side-exit adaptor 800 and the spring 804 can have threaded ends 824, 828 and 832 to engage the threaded mast bore 30. In one aspect, a threaded end 824 of the mast 314 can be directly received in the threaded mast bore 30. In another aspect, the side-exit adaptor 800 and/or the spring 804 can be coupled between the mast 314 and the mast bore 30 of the mount 10 and the articulated elbow 14. For example, the threaded end 824 of the mast 314 can be received by the side-exit adaptor 800; a threaded end 828 of the side-exit adaptor 800 can be received by the spring 804; and a threaded end 832 of the spring 804 can be received in the threaded mast bore 30 of the mount 10.

As described herein, the mast bore 30 can be a blind hole in the upper mount 18 (FIGS. 1-7) without passing through the upper mount 18 and into the gap 58 between the upper and lower mounts 18 and 22. Thus, the mount 10 and the articulated elbow 14 resist having the coaxial cable 322 therein. The side-exit adaptor 800 can be coupled between the mast 314 and the upper mount 18 to divert the coaxial cable 322 around the mount 10 and the articulated elbow 14. The side-exit adaptor 800 can have a proximal threaded end 828 couplable to the threaded mast bore 30, such as by the spring 804. The side-exit adaptor 800 can also have a distal threaded bore 836 to be coupled to the threaded end 824 of the mast 314. The side-exit adaptor 800 can also have a lateral aperture 840 through a lateral side. A hollow 844 can extend from the distal threaded bore 836 to the lateral aperture 840 to receive the coaxial cable 322 from the antenna 318 therethrough without passing through the gap 58 between the upper and lower mounts 18 and 22 of the articulated elbow 14.

Figure 9:
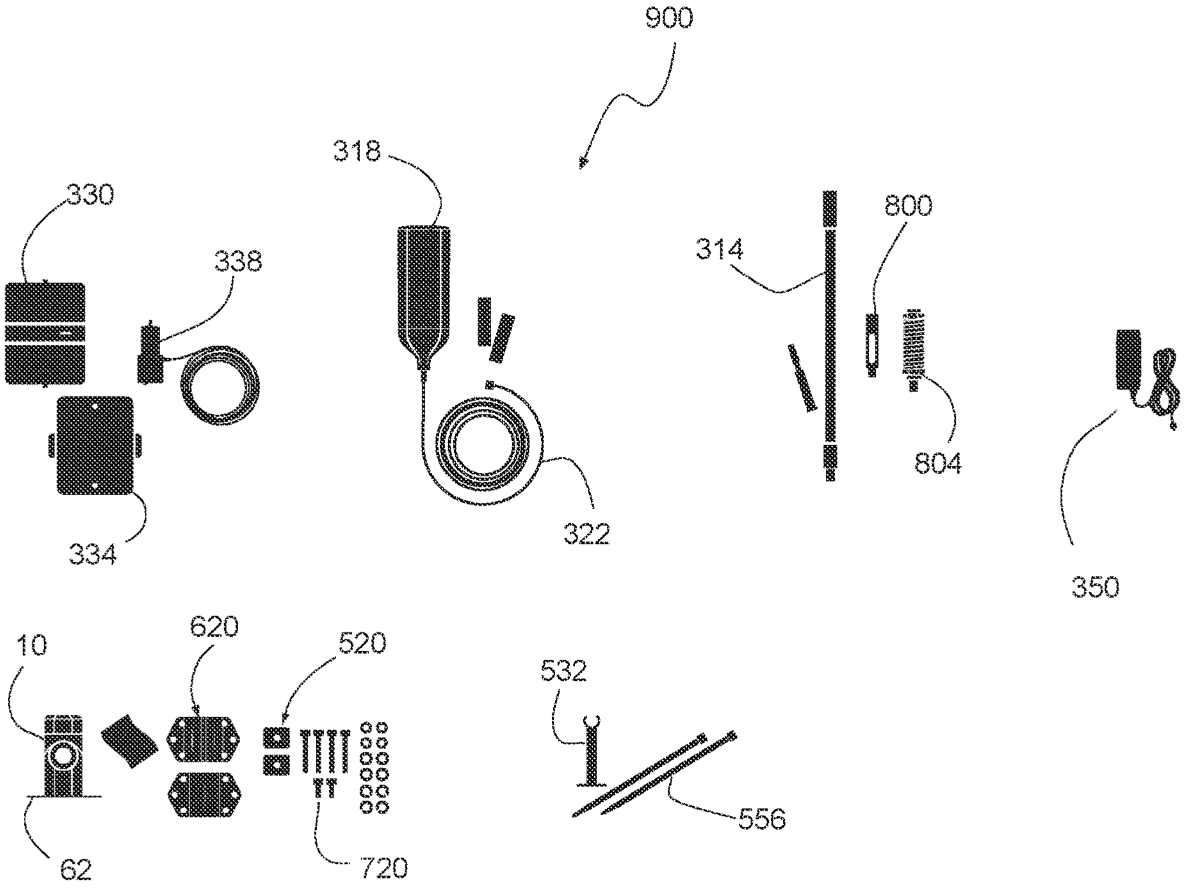
FIG. 9 is a schematic view of the mount system in another example.

FIG. 9 depicts an example of a mount system 900 in an example of the invention. The system 900 can include a kit of parts with the various components described herein. The system 900 can comprise a plurality of different attachment fasteners selectively coupled to the base plate 62 to secure the base plate 62 to the vehicle 310 (FIG. 6), such as the T-fastener 520, the pole clamp fastener 620, and the threaded fastener 720. In one aspect, the mount system 900 can also include an inside antenna 350 that can be coupled to the booster 330 (FIG. 3*a*) and operatively coupled to the mobile device 326 (FIG. 3*a*).

A method for mounting the antenna 318 using the mount 10 and mount systems described herein can comprise the following steps, not necessarily in the following order unless otherwise specified, and not all steps are necessary:

1) selecting a desired attachment fastener (e.g. the T-fastener 520, the pole clamp fastener 620, or the threaded fastener 720) for the vehicle 310 or associated structure (e.g. the T-track 504, the pole 604, or the flat surface 704);
2) attaching the desired attachment fastener to the vehicle 310 or associated structure;
3) attaching the base plate 62 of the mount 10 to the desired attachment fastener;
4) attaching the antenna 318 to the mast 314;
5) feeding the coaxial cable 322 through the hollow 820 in the mast 314;
6) coupling the coaxial cable 322 to the 318 antenna;
7) attaching the threaded end 824 of the mast 314 to the side-exit adaptor 800;
8) feeding the coaxial cable 322 through the hollow 844 of the side-exit adaptor 800;
9) attaching the threaded end 828 of the side-exit adaptor 800 to the spring 804; and
10) attaching the threaded end 838 of the spring 804 to the threaded mast bore 30 of the mount 10.

A method for using the mount 10 and the mount systems described herein can comprise the following steps, not necessarily in the following order unless otherwise specified, and not all steps are necessary:

1) pulling the locking knob 66 away from the mount 10 and the articulated elbow 14 to the unlock position (FIG. 1*e*);
2) orienting the upper mount 18 with respect to the lower mount 22 to orient the mast 313 vertically to the raised orientation (FIG. 1*c*);
3) releasing the locking knob 66 and allowing the locking knob 66 to move towards the mount 10 and the articulated elbow 14 with the locking pin(s) 94 entering the bore(s) 98 of the array of locking bores (FIG. 1*d*);
4) pulling the locking knob 66 away from the mount 10 and the articulated elbow 14 to the unlock position (FIG. 1*e*);
5) orienting the upper mount 18 with respect to the lower mount 22 to orient the mast 314 horizontally to the lowered orientation (FIGS. 5*b* and 6*b*);
6) releasing the locking knob 66 and allowing the locking knob 66 to move towards the mount 10 and the articulated elbow 14 with the locking pin(s) 94 entering the bore(s) 98 of the array of locking bores (FIG. 1*d*); and
7) transporting the vehicle 310.

The terms “wireless repeater” and “signal booster” and “cellular signal amplifier” are used interchangeably herein.

As used herein, the term “circuitry” may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. An antenna mount system configured to mount an antenna on a mast to a vehicle, comprising:
- an articulated elbow configured to be carried by the vehicle and having upper and lower mounts pivotally coupled together by an axle;
- a locking knob carried by the articulated elbow and slidable along the axle towards and away from the articulated elbow;
- at least one locking pin carried by the locking knob and slidable with the locking knob between locked and unlocked positions;
- a radial array of bores formed in the articulated elbow and arrayed about the axle, each bore being selectively engageable by the at least one locking pin to lock the upper mount with respect to the lower mount; and a mast bore formed in the upper mount configured to be coupled to an end of the mast.

2. The antenna mount system in accordance with claim 1, further comprising:

the mast bore being a blind hole in the upper mount without passing therethrough to a gap between the upper and lower mounts.

3. The antenna mount system in accordance with claim 1, further comprising:

at least one through bore in the articulated elbow;

the at least one locking pin slidably received in the at least one through bore; and the at least one locking pin spanning the at least one through bore and at least one of the bores of the radial array of bores in the locked position.

4. The antenna mount system in accordance with claim 1, further comprising:

the lower mount further comprising:

a plinth configured to be selectively coupled to the vehicle;

a lower pillar carried by and extending from the plinth; and the plinth and the lower pillar forming a solid lower mount; and the upper mount further comprising:

an upper pillar pivotally coupled to the lower pillar by the axle;

a cap carried by the upper pillar and having the mast bore; and the cap and the upper pillar forming a solid upper mount.

5. The antenna mount system in accordance with claim 4, further comprising:

a gap between a top of the lower pillar of the lower mount and the cap of the upper mount; and the gap being free of a coaxial cable when the mast is coupled to the cap of the upper mount.

6. The antenna mount system in accordance with claim 4, further comprising:

the upper and lower pillars being offset with respect to the cap and the plinth, respectively;

the upper and lower mounts having an aligned orientation with the upper and lower pillars aligned and with the cap positioned over the plinth;

the cap and the plinth having a matching profile in a plan view in the aligned orientation; and the upper and lower pillars filling a majority of a gap between the cap and the plinth in the aligned orientation.

7. The antenna mount system in accordance with claim 1, further comprising:

the at least one locking pin comprising a pair of locking pins;

the pair of locking pins being located radially spaced-apart from the axle;

the pair of locking pins being located on opposite sides of the axle from one another;

the radial array of bores circumscribing the axle; and the pair of locking pins selectively engaging opposite bores of the radial array of bores in the locked position.

8. The antenna mount system in accordance with claim 1, further comprising:

a T-fastener coupled to the articulated elbow and configured to engage a T-track carried by the vehicle, the T-fastener comprising:

an enlarged head configured to fit inside a channel of the T-track and abut to inner lips of an opening to the T-track; and a threaded shaft extending from the enlarged head.

9. The antenna mount system in accordance with claim 8, further comprising:

a base plate configured to be mounted to the vehicle with the articulated elbow carried by the base plate;

the T-fastener selectively coupled to the base plate and configured to secure the base plate with respect to the vehicle; and the base plate having long and short dimensions with the long dimension longer than the short dimension and configured to be aligned with a longitudinal axis of the T-track.

10. The antenna mount system in accordance with claim 9, further comprising:

a stabilizer arm spaced-apart from the base plate and configured to extend between the T-track and the mast, the stabilizer arm comprising:

an enlarged head at a proximal end of the stabilizer arm configured to fit inside the channel of the T-track and abut to the inner lips of the opening to the T-track;

a yoke at a distal end of the stabilizer arm, the yoke having a pair of arms with a gap sized and shaped to receive the mast therebetween and an opening into the gap between distal free ends of the pair of arms sized smaller than the gap and configured to be smaller than a cross-sectional dimension of the mast; and the arms of the yoke being flexible and elastic and configured to separate to increase a size of the opening to receive the mast therethrough and return to decrease the size of the opening to retain the mast in the gap.

11. The antenna mount system in accordance with claim 10, further comprising:

the articulated elbow having a retracted height between the base plate and an axis of the mast bore formed in the upper mount in a lowered orientation;

the stabilizer arm having an arm height parallel to the retracted height of the articulated elbow between the base plate and an axis of the gap; and the arm height of the stabilizer arm being greater than the retracted height of the articulated elbow configured to induce a cantilevered spring force in the mast extending between the mast bore of the articulated elbow and the gap of the stabilizer arm to retain a position of the stabilizer arm with respect to the T-track.

12. The antenna mount system in accordance with claim 1, further comprising:

a pole clamp fastener coupled to the articulated elbow and configured to engage a pole carried by the vehicle, the pole clamp fastener comprising:

a pair of brackets having indentations configured to face one another with the pole therebetween;

threaded fasteners extending between the pair of brackets and configured to clamp the pole between the pair of brackets; and the articulated elbow coupled to one of the pair of brackets.

13. The antenna mount system in accordance with claim 12, further comprising:

a stabilizer arm configured to extend between the pole and the mast, the stabilizer arm comprising:

an enlarged head at a proximal end of the stabilizer arm configured to engage the pole;

a yoke at a distal end of the stabilizer arm, the yoke having a pair of arms with a gap sized and shaped to receive the mast therebetween and an opening into the mast between distal free ends of the pair of arms sized smaller than the gap and configured to be smaller than a cross-sectional dimension of the mast; and the arms of the yoke being flexible and elastic and configured to separate to increase a size of the opening to receive the mast therethrough and return to decrease the size of the opening to retain the mast in the gap.

14. The antenna mount system in accordance with claim 13, further comprising:

the articulated elbow having a retracted height between the pole and an axis of the mast bore formed in the upper mount in a lowered orientation;

the stabilizer arm having an arm height parallel to the retracted height of the articulated elbow between the pole and an axis of the gap; and the arm height of the stabilizer arm being greater than the retracted height of the articulated elbow configured to induce a cantilevered spring force in the mast extending between the mast bore of the articulated elbow and the opening of the stabilizer arm.

15. The antenna mount system in accordance with claim 1, further comprising:

a base plate configured to be mounted to the vehicle with the articulated elbow carried by the base plate;

the base plate configured to engage a flat surface carried by the vehicle; and a fastener configured to extend between the base plate and the flat surface of the vehicle.

16. The antenna mount system in accordance with claim 1, further comprising: the mast bore being a blind hole in the upper mount without passing therethrough to a gap between the upper and lower mounts; and a side-exit adaptor configured to mount between the mast and the upper mount, the side-exit adaptor having proximal threaded end couplable to the threaded mast bore; a distal threaded bore configured to be couplable to the threaded end of the mast; a lateral aperture; and a hollow extending from the distal threaded bore to the lateral aperture configured to receive a coaxial cable from the antenna therethrough without passing through the gap between the upper and lower mounts of the articulated elbow.

17. The antenna mount system in accordance with claim 1, further comprising: an interface between the upper and lower mounts of the articulated elbow; and an annular elastic member pressed between the interface between the upper and lower mounts.

18. The antenna mount system in accordance with claim 1, further in combination with:

the mast coupled to the mast bore and having a hollow therethrough;

the antenna carried by the mast; and a coaxial cable coupled to the antenna and extending through the hollow of the mast.

19. An antenna mount system configured to mount an antenna on a mast to a vehicle, comprising:

a base plate configured to be mounted to the vehicle;

an attachment fastener selectively coupled to the base plate and configured to secure the base plate to the vehicle;

an articulated elbow carried by the base plate, and comprising:

a lower mount carried by the base plate;

an upper mount pivotally coupled to the lower mount; and an axle coupled between the upper and lower mounts;

the upper mount being selectively pivotal about the axle with respect to the lower mount and the base plate through a plurality of discrete angular orientations, comprising:

a raised orientation in which the upper mount is raise upright and configured to deploy the antenna on the mast; and a lowered orientation in which the upper mount is lowered with respect to the raised orientation and configured to retract the antenna on the mast;

a locking knob carried by the articulated elbow and slidable along the axle towards and away from the articulated elbow, the locking knob having at least two positions, comprising:

a locked position towards the articulated elbow; and an unlock position away from the articulated elbow;

a spring carried by the axle and positioned between the locking knob and a head of the axle and biasing the locking knob towards the articulated elbow and into the locked position;

at least one locking pin carried by the locking knob and slidable with the locking knob between the locked and unlocked positions;

a radial array of bores formed in the articulated elbow and arrayed about the axle, each bore being selectively engageable by the at least one locking pin to lock the upper mount with respect to the lower mount;

a mast bore formed in the upper mount configured to be coupled to an end of the mast;

a stabilizer arm configured to extend between the vehicle and the mast, the stabilizer arm comprising:

an enlarged head at a proximal end of the stabilizer arm configured to engage the vehicle;

a yoke at a distal end of the stabilizer arm, the yoke having a pair of arms with a gap sized and shaped to receive the mast therebetween and an opening into the gap between distal free ends of the pair of arms sized smaller than a cross-sectional dimension of the mast; and the arms of the yoke being flexible and elastic and configured to separate to increase a size of the opening to receive the mast therethrough and return to decrease the size of the opening to retain the mast in the gap;

the articulated elbow having a retracted height between the base plate and an axis of the mast bore formed in the upper mount in the lowered orientation;

the stabilizer arm having an arm height parallel to the retracted height of the articulated elbow between the base plate and an axis of the gap; and the arm height of the stabilizer arm being greater than the retracted height of the articulated elbow configured to induce a cantilevered spring force in the mast extending between the mast bore of the articulated elbow and the opening of the stabilizer arm.

20. An antenna mount system configured to mount to a vehicle, the system comprising:

an antenna;

a coaxial cable operatively couplable to the antenna;

a mast having a proximal threaded end and a distal end couplable to the antenna, the mast having a hollow therethrough to receive the coaxial cable;

a side-exit adaptor having proximal end, a distal threaded bore couplable to the threaded end of the mast, a lateral aperture, and a hollow extending from the distal threaded bore to the lateral aperture to receive the coaxial cable therethrough;

an upper mount with a mast bore couplable to the proximal end of the side-exit adaptor to carry the mast;

a lower mount pivotally coupled to the upper mount;

an axle coupled between the upper and lower mounts;

the upper mount being selectively pivotal about the axle with respect to the lower mount through a plurality of discrete angular orientations, comprising:

a raised orientation in which the upper mount is raised upright with the antenna elevated on the mast; and a lowered orientation in which the upper mount is lowered with respect to the raised orientation to retract the antenna on the mast;

a locking knob carried by the lower mount and slidable along the axle between a locked position towards the upper mount and an unlock position away from the upper mount;

a spring carried by the axle and positioned between the locking knob and a head of the axle and biasing the locking knob towards the locked position;

at least one locking pin carried by the locking knob and slidable with the locking knob between the locked and unlocked positions;

a radial array of bores arrayed about the axle, each bore being selectively engageable by the at least one locking pin to lock the upper mount with respect to the lower mount;

a base plate carrying the upper mount and configured to be mounted to the vehicle;

a plurality of fasteners selectively couplable to the base plate and configured to secure the base plate to the vehicle, comprising:

i) a T-fastener configured to engage a T-track carried by the vehicle, the T-fastener comprising:

an enlarged head configured to fit inside a channel of the T-track and abut to inner lips of an opening to the T-track; and a threaded shaft extending between the enlarged head and the base plate;

ii) a pole clamp fastener configured to engage a pole carried by the vehicle, the pole clamp fastener comprising:

a pair of brackets having indentations configured to face one another with the pole therebetween;

threaded fasteners extending between the pair of brackets and configured to clamp the pole between the pair of brackets; and the base plate mountable to one of the pair of brackets;

iii) a threaded fastener being configured to engage a flat surface carried by the vehicle and configured to extend between the base plate and the flat surface of the vehicle.

* * * * *